(12) United States Patent
Dietsche et al.

(10) Patent No.: US 7,879,158 B2
(45) Date of Patent: Feb. 1, 2011

(54) NITROGENOUS POLYMERS FOR METAL SURFACE TREATMENT

(75) Inventors: Frank Dietsche, Schriesheim (DE); Helmut Witteler, Wachenheim (DE); Matthias Klüglein, Ludwigshafen (DE); Frank Klippel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 868 days.

(21) Appl. No.: 10/548,803

(22) PCT Filed: Mar. 12, 2004

(86) PCT No.: PCT/EP2004/002623

§ 371 (c)(1),
(2), (4) Date: Sep. 13, 2005

(87) PCT Pub. No.: WO2004/081128

PCT Pub. Date: Sep. 23, 2004

(65) Prior Publication Data

US 2006/0162820 A1 Jul. 27, 2006

(30) Foreign Application Priority Data

Mar. 13, 2003 (DE) ................. 103 10 972

(51) Int. Cl.
C23C 22/53 (2006.01)
C23C 22/56 (2006.01)
C23C 22/48 (2006.01)

(52) U.S. Cl. ............... 148/275; 148/274; 106/14.11; 106/14.16; 106/14.41; 106/14.42; 106/14.37; 106/14.44

(58) Field of Classification Search ........... 106/14.11, 106/14.16, 14.37, 14.41, 14.42, 14.44; 148/274, 148/275

See application file for complete search history.

(56) References Cited

U.S. PATENT DOCUMENTS

| 5,456,767 | A | * | 10/1995 | Shah et al. ................. 148/251 |
| 5,494,535 | A | | 2/1996 | Keller et al. |
| 6,146,473 | A | * | 11/2000 | Shibata et al. ............... 148/251 |
| 6,461,440 | B1 | | 10/2002 | Sutoris et al. |
| 6,554,916 | B2 | * | 4/2003 | Kojima et al. ............... 148/275 |
| 7,371,272 | B2 | * | 5/2008 | Inbe et al. ................. 106/14.41 |
| 2003/0027133 | A1 | | 2/2003 | Cawse |
| 2003/0138567 | A1 | | 7/2003 | Schenzle et al. |
| 2004/0151619 | A1 | | 8/2004 | Quellhorst et al. |

FOREIGN PATENT DOCUMENTS

| DE | 43 42 281 A1 | 6/1995 |
| DE | 44 09 306 A1 | 9/1995 |
| DE | 100 13 828 A1 | 10/2000 |
| DE | 100 05 113 A1 | 8/2001 |
| EP | 0 471 336 A2 | 2/1992 |
| EP | 0 933 409 A1 | 8/1999 |
| JP | 4-231679 A | 8/1992 |
| JP | 06-081158 | 3/1994 |
| JP | 6-81159 A | 3/1994 |
| JP | 2000-160369 A | 6/2000 |
| WO | WO-97/40208 A1 | 10/1997 |
| WO | WO-03/002781 A1 | 1/2003 |

OTHER PUBLICATIONS

"Effect of copolymer composition in vinyl silane modified polyvinylimidazole on copper corrosion protection at elevated temperature" by Kim et al. *Polymer* vol. 39, No. 17, 1998, pp. 4065-4074.
XP-002289599 "Inhibition of Copper Corrosion by Azole Compounds in Acidic Aqueous Solutions" by Johnson et al., 1986 (abstract only, one page).

* cited by examiner

*Primary Examiner*—Roy King
*Assistant Examiner*—Lois Zheng
(74) *Attorney, Agent, or Firm*—Connolly Bove Lodge & Hutz LLP

(57) ABSTRACT

The present invention relates to a passivating layer on a metal surface, obtainable by contacting the metal surface with a composition comprising a water-soluble nitrogenous polymer, to a surface composed of a metal surface and the passivating layer of the invention, to a process for forming a passivating layer on a metal surface, to the use of a composition comprising a water-soluble nitrogenous polymer to passivate a metal surface, and to a system on a metal surface that comprises a passivating layer of the invention and further coating films.

7 Claims, No Drawings

NITROGENOUS POLYMERS FOR METAL SURFACE TREATMENT

This application is a National Stage of PCT/EP2004/002623 filed Mar. 12, 2004 which in turn claims priority from German Application 103 10 972.2 filed Mar. 13, 2003.

The present invention relates to a passivating layer on a metal surface, containing a nitrogenous polymer, to a process for forming this passivating layer, and to the use of a composition comprising a water-soluble nitrogenous polymer to passivate a metal surface, to a coating system on a metal surface, comprising said passivating layer, and to an applied coating system, and also to a process for forming this coating system and to a surface composed of a metal surface and the passivating layer of the invention.

Metallic materials, particularly iron and steel, are commonly galvanized in order to protect them against corrosive environmental effects. The corrosion protection afforded by the zinc is based on the fact that it is baser than the metallic material and consequently draws the corrosive attack exclusively to itself first of all—that is, it functions as a sacrificial layer. The metallic material itself remains intact as long as it is still covered by a continuous layer of zinc, and the mechanical functionality is retained for longer periods of time than in the case of ungalvanized parts. Corrosive attack on such a zinc layer can in turn be retarded by the application of a passivating layer. This is done particularly in the case of electrolytically galvanized parts, and both for parts which are subsequently coated and for those which are employed without a coating. Aluminum surfaces as well, particularly if they are to be coated subsequently, are frequently provided with a passivating layer. The passivating layer retards corrosive attack on the metal surface and at the same time serves to improve the adhesion of any coating films that are to be applied. The term "passivating layer" is frequently replaced, synonymously, by the term "conversion coat".

To date, passivating layers on zinc or aluminum surfaces have usually been obtained by immersing the workpiece to be protected in aqueous acidic solutions of $CrO_3$. Following immersion and drying, the workpiece is protected against corrosion. On immersion, some of the metal to be protected dissolves and immediately an oxide film is formed on the metal surface. This film, therefore, is similar to the oxide film which is present in any case on many metals, but it is much more coherent and better at adhering than the latter. From the standpoint of passivation, this Cr(VI) treatment is optimal. Cr(VI) treatment extends the time taken for an uncoated galvanized panel to develop white rust from less than one hour to more than 100 hours.

In order to avoid the use of the Cr(VI) compounds, which are extremely toxic and carcinogenic, FP-A 0 907 762 proposes a passivation by means of acidic, aqueous solutions of Cr(III) salts. Applied in so-called "high-build" mode, with a thickness of from 300 to 400 µm, these passivating layers offer outstanding corrosion protection.

For the purpose of avoiding the use of heavy metals such as Cr(VI) and also Cr(III), the use of polymers is gaining in importance.

DE-A 100 05 113, for instance, relates to an application solution which comprises phosphoric acid and/or at least one fluoro acid of one or more elements from the group consisting of Zr, Ti, Hf, and Si or in each case their anions and also a homopolymer or copolymer of vinylpyrrolidone and to a process for corrosion protection treatment of a metal surface, in which the metal surface is contacted with a homopolymer or copolymer of vinylpyrrolidone. According to DE-A 100 05 113 homopolymers or copolymers of vinylpyrrolidone are added to known passivating agents based on fluorometallates of Zr, Ti, Hf or Si with the aim of improving the corrosion protection.

JP-A 04231679 relates to corrosion protectants or surfaces of copper or copper alloys, in which the copper surface is first treated with an alcoholic solution containing polyvinylimidazole and then treated with a solution comprising a zinc salt. This treatment enhances the corrosion protection and the heat resistance of the copper surface.

DE-A 44 09 306 relates to a process for modifying cleaned or chemically pretreated metal surfaces with aqueous solutions of organic polymers containing amino groups, in particular with polyvinylamines.

It is an object of the present invention to provide a passivating layer on a metal surface that satisfies the following requirements:
- it must inhibit corrosion, for many applications even without subsequent coating;
- it must not impair the adhesion of coating material and should preferably enhance the adhesion of coating material; in other words, the layer should in general not be hydrophobicizing;
- it should be as thin as possible in order to ensure that the passivated workpieces maintain their dimensions;
- it must retain its corrosion-inhibiting effect even after heating at temperatures of 120° C.;
- it should be neutral in color relative to the substrate metal but should as far as possible be discernible with the eye in order to make it easier to detect defects and to allow simple distinguishing of passivated from unpassivated parts;
- it should be able to be produced without complicated process steps.

It is an object of the present invention in particular to provide particularly thin passivating layers which still exhibit outstanding inhibition of corrosion.

We have found that this object is achieved by a passivating layer on a metal surface, obtainable by contacting the metal surface with a composition comprising a water-soluble nitrogenous polymer, the polymer being a base, and an aqueous solution of the polymer forming a precipitate at a pH<7 when one or more salts of the substrate metal are added.

The passivating layer of the invention is notable for the fact that even in the form of a very thin coat it exhibits an outstanding corrosion inhibition effect.

The metal surface used can generally be any desired metal surface. Generally speaking, suitable metal surfaces are standard industry materials, selected from the group consisting of steel, cast iron, zinc, aluminum, magnesium, and alloys of these metals with one another or with other alloying ingredients. Particular preference is given to zinc and aluminum and to alloys of these metals with other alloying ingredients, a surface of zinc or zinc alloys generally being obtained by an operation of galvanizing a metallic material such as iron or steel.

It is conceivable to use metal surfaces which have not been pretreated. Preferably, however, the metal surfaces have at least been cleaned before they are contacted with the composition comprising a water-soluble nitrogenous polymer. Cleaning in this case preferably includes degreasing of the metal surface. Suitable cleaning and degreasing processes are known to the skilled worker.

The water-soluble nitrogenous polymer (component A), which is a base and in aqueous solution forms a precipitate at a pH<7 when one or more salts of the substrate metal are added, preferably contains vinylimidazole. With particular preference the polymer contains >50% by weight of vinylimidazole and, if desired, at least one further monomer. Reference to polymer in the context of the present invention shall be understood to include both homopolymers and copolymers.

With very particular preference the polymer used in accordance with the invention (component A) comprises the following components:
a) >45% by weight to 100% by weight, preferably >55% by weight, more preferably >60% by weight of vinylimidazole as component Aa,
b) 0 to <50% by weight, preferably <40% by weight, more preferably <30% by weight of N-vinyllactams, further vinyl heteroaromatics, vinyl esters, $C_1$-$C_{10}$ alkyl acrylates or methacrylates or a mixture of said monomers as component Ab,
c) 0 to 5% by weight, preferably <4% by weight, more preferably <3% by weight of monoethylenically unsaturated monomers containing acid groups as component Ac.

Suitable components Ab are N-vinyllactams, N-vinylcaprolactam for example, N-vinylpyrrolidone, and N-vinylpiperidone; suitable other vinyl heteroaromatics are vinylpyridines and vinylpyridine N-oxides; suitable vinyl esters are, for example, vinyl acetate and vinyl propionate, and suitable $C_1$-$C_{10}$ alkyl (meth)acrylates are methyl, ethyl, and butyl acrylate and the corresponding methacrylates.

As component Ab it is preferred to use N-vinylcaprolactam, N-vinylpyrrolidone and vinylpyridine.

Suitable components Ac are monoethylenically unsaturated compounds containing at least one acid group, for example, a carboxyl group, a sulfonic acid group or a phosphonic acid group. Examples of compounds suitable as component Ac are acrylic acid, methacrylic acid, dimethacrylic acid, ethylacrylic acid, crotonic acid, allylacetic acid, and vinylacetic acid. Also suitable as component Ac are monoethylenically unsaturated dicarboxylic acids, for example, maleic acid, fumaric acid, itaconic acid, mesaconic acid, methylenemalonic acid, citraconic acid, maleic anhydride, itaconic anhydride, and methylenemalonic anhydride, the anhydrides generally undergoing hydrolysis when introduced into water to form the corresponding dicarboxylic acids. As component Ac it is additionally possible to use monomers containing sulfonic acid groups, for example, 2-acrylamido-2-methylpropanesulfonic acid, 3-sulfopropyl (meth)acrylate, vinylsulfonic acid, methallylsulfonic acid, and allylsulfonic acid, and also monomers containing phosphonic acid groups, such as vinylphosphonic acid. The monomers specified as component Ac can be used either alone or as a mixture with one another.

As component Ac it is preferred to use monomers selected from the group consisting of acrylic acid, methacrylic acid, maleic acid, maleic anhydride, fumaric acid, itaconic acid, 2-acrylamido-2-methylpropanesulfonic acid, vinylsulfonic acid, acryloyl- or methacryloylsulfonic acid 3-sulfopropyl ester, and vinylphosphonic acid.

The monomers used as component Ac can be used either in the form of the free acids or, preferably, in the form of their alkali metal, alkaline earth metal or ammonium salts. Preferred alkali metal salts are sodium and potassium salts; preferred alkaline earth metal salts are magnesium and calcium salts.

In one especially preferred embodiment the water-soluble nitrogenous polymer is homopolyvinylimidazole, i.e., the polymer is composed 100% by weight of N-vinylimidazole.

The weight average of the molecular weight (Mw) of the water-soluble nitrogenous polymer used in accordance with the invention is generally from 1000 to 1 000 000 g/mol, preferably from 10 000 to 150 000 g/mol. In the case of the homopolyvinyl-imidazole used with especial preference it has a molecular weight of in general from 5000 to 200 000 g/mol. The molecular weight (Mw) was determined by means of gel permeation chromatography with polystyrene standard.

By copolymers are meant, in general, compounds having at least 3 repeating units, preferably more than 10 repeating units.

The water-soluble nitrogenous polymer used in accordance with the invention can be prepared in any way known to the skilled worker. Possible examples include preparation of the polymer by bulk polymerization, suspension polymerization, emulsion polymerization or solution polymerization, in toluene, water or ethanol for example. A further possibility is to prepare the water-soluble nitrogenous polymer used in accordance with the invention by a precipitation polymerization from an organic solvent, such as alkanes or cycloalkanes, or in accordance with the process disclosed in DE-A 43 42 281.

The water-soluble nitrogenous polymer used with preference, composed of >50% by weight of vinylimidazole and, if desired, at least one further monomer, and the homopolyvinylimidazole used with especial preference, are preferably prepared in accordance with a process corresponding to the process disclosed in DE-A 43 42 281.

In one preferred embodiment of the present application the metal surface is preferably contacted with a composition comprising
a) a water-soluble nitrogenous polymer as defined above, as component A;
b) water or another solvent capable of dissolving or dispersing, suspending or emulsifying a polymer (component A), as component B;
c) if desired, at least one surface-active compound, at least one emulsifier and/or at least one dispersant, as component C.

Component A

The water-soluble nitrogenous polymer used as component A has already been defined above.

In the compositions used in accordance with the invention this polymer is used in general in an amount of from 0.01 to 100 g/l, preferably from 0.01 to 70 g/l, more preferably from 0.01 to 50 g/l, based in each case on 1 l of the composition.

Component B

Component B is water or another solvent capable of dissolving, dispersing, suspending or emulsifying the polymer (component A). For the purposes of the present text a solvent is a liquid matrix in which the various ingredients of the composition of the invention are present in a very finely divided form. Such fine division can be, for example, in the sense of a molecularly disperse distribution, a true solution of the ingredients in the solvent. However, the term "solvent" also encompasses liquid matrices in which the ingredients are distributed in the sense of an emulsion or dispersion, i.e., do not form a molecularly disperse solution.

Examples of suitable solvents include water and also water-miscible and water-immiscible solvents. Examples of suitable water-miscible solvents are primary or secondary mono- or polyalcohols having 1 to about 6 carbon atoms, such as methanol, ethanol, propanol, isopropanol, n-butanol, isobutanol, pentanol, hexanol, cyclohexanol or glycerol. Likewise suitable as water-miscible solvents are low molecular mass ketones such as acetone or methyl ethyl ketone or ether alcohols such as diethylene glycol or triethyl glycol. Likewise suitable in the context of the present invention are solvents which are of low or zero miscibility with water.

These include, for example, ethers such as diethyl ether, dioxane or tetrahydrofuran, aromatic solvents such as toluene or xylene, halogenated solvents such as dichloromethane, chloroform or tetrachloromethane, and optionally substituted aliphatic solvents, including for example the higher homologues of the abovementioned alcohols and ketones and also paraffinic hydrocarbons.

The abovementioned solvents can be used individually or as a mixture of two or more of said solvents. In one preferred embodiment of the present invention the solvent used is water, alone or in a mixture with one or more of the abovementioned, preferably water-soluble, solvents. If a solvent is to be used in the context of the present invention that contains water and a water-immiscible solvent, then the solvent can contain, for example, an emulsifier in order to allow a substantially stable W/O or O/W emulsion.

If the composition of the invention comprises a mixture of water and another, water-miscible solvent, the fraction of water in such a mixture is preferably at least about 30% by weight or more, for example at least about 40% or at least about 50% by weight. In one particularly preferred embodiment of the present invention the water fraction is at least about 75% by weight. Examples of suitable combinations of water and water-miscible solvents are water/methanol, water/ethanol, water/propanol or water/isopropanol. Preferred in the context of the present invention is a mixture of water and ethanol, the water fraction being preferably greater than about 75% by weight, for example, greater than about 80% or about 85% by weight.

In one preferred embodiment of the present invention a composition of the invention comprises at least one solvent which has a water content of at least about 50% by weight.

With particular preference water exclusively is used as solvent.

The composition used preferably as aqueous solution in accordance with the invention generally has a pH of from 1 to 6, it being possible to choose narrower pH ranges depending on the substrate and mode of application and also on the period of exposure of the surface, of the substrate metal to the composition used in accordance with the invention. By way of example, for the treatment of bright metal surfaces the pH is preferably adjusted to the range from 2 to 6, preferably to the range from 2 to 4 when treating aluminum surfaces, and preferably to the range from 3 to 5 when treating steel, zinc or galvanized steel. The surfaces of a substrate metal which have already been pretreated and which carry, for example, a phosphate layer are preferably contacted with a composition used in accordance with the invention with a pH of from 3.5 to 5.

The amount of water or another solvent is a function of whether the composition of the invention is a ready-to-use composition or a concentrate, and also of the respective end use. Basically, the amount is a function of the concentrations of the individual components that are specified for the ready-to-use composition.

Component C

Where appropriate, the composition of the invention may further comprise surface-active compounds, emulsifiers and/or dispersants. Suitable surface-active compounds are surfactants, which may be cationic, anionic, zwitterionic or non-ionic. Examples of suitable surfactants are alkyl and alkenyl alkoxylates of the type R-EO$_n$/PO$_m$ in which R are generally linear or branched $C_6$-$C_{30}$ alkyl radicals, preferably $C_8$-$C_{20}$ alkyl radicals, and EO is an ethylene oxide unit and PO is a propylene oxide unit, the sequential arrangement of EO and PO being arbitrary, and n and m independently of one another being >1 and <100, preferably >3 and <50, examples being Emulan®, Lutensol®, and Plurafac® (from BASF), alkylphenol ethoxylates, EO/PO block copolymers (Pluronic®, from BASF), alkyl ether sulfates, and alkylammonium salts, referred to as quats.

The amount of these components in the composition of the invention is generally 0.01-100 g/l, preferably from 0.1 to 20 g/l.

In one preferred embodiment the composition used in accordance with the invention comprises further to components A, B, and, where appropriate, C:

d) at least one salt, acid or base based on transition metal cations, transition metal oxo anions, fluorometallates or lanthanoids as component D, and/or e) at least one acid selected from the group consisting of phosphoric acid, sulfuric acid, sulfonic acids, nitric acid, hydrofluoric acid, and hydrochloric acid, as component E, and/or f) at least one further corrosion inhibitor as component F, and/or g) compounds of Ce, Ni, Co, V, Fe, Zn, Zr, Ca, Mn, Mo, W, Cr and/or Bi as component G, and/or h) further auxiliaries and additives as component H.

These compositions are suitable for passivating, especially phosphating, the metal surfaces mentioned in the present specification.

Component D

Suitable components D are salts, acids, and bases based on transition metal cations, transition metal oxo anions, fluorometallates or lanthanoids. Suitable transition metal cations are, in particular, fluorometallates of Ti(IV), Zr(IV), Hf(IV) and/or Si(IV), and a particularly suitable lanthanoid is Ce. Also suitable are tungstates and molybdates.

Compositions in accordance with the present specification which comprise component D are especially suitable either for depositing a corrosion protection coat on a metal surface or for reinforcing the corrosion protection effect of a corrosion coat already deposited on the metal surface. In the compositions of the invention, the inventively used polymers (component A) have an outstanding corrosion protection effect. In general the use of component A in the compositions used in accordance with the invention leads to corrosion protection properties so good that there is no need to add component D. In one particularly preferred embodiment, therefore, compounds of component D are not present in the compositions used in accordance with the invention.

The amount of component D—where component D is present in the compositions of the invention—is preferably from 0.02 to 20 g/l.

Component E

In addition to or instead of component D, the compositions of the invention may further comprise at least one acid selected from the group consisting of phosphoric acid, sulfuric acid, sulfonic acids such as methanesulfonic acid, vinylsulfonic acid, allylsulfonic acid, m-nitrobenzenesulfonic acid, naphthalenesulfonic acid, and derivatives thereof, nitric acid, hydrofluoric acid, and hydrochloric acid. The nature of the acid used is dependent on the type of treatment of the metal surface. Accordingly, phosphoric acid is generally used in phosphating baths for phosphating steel surfaces. In this case the composition used in accordance with the invention is a phosphating solution. A distinction is made here between what are known as "non-film-forming" phosphating solutions, i.e., solutions containing no divalent metals. These non-film-forming phosphating solutions are in the form, for example, of an iron phosphating solution. Where the phosphating solutions do contain ions of divalent metals, e.g. zinc and/or manganese, the phosphating solutions are said to be "film-forming". Compositions in accordance with the present specification that comprise nitric acid are particularly suitable for the surface treatment of zinc and its alloys, whereas compositions comprising hydrofluoric acid are particularly suitable for the surface treatment of aluminum and its alloys.

The amount of acid used may vary depending on the field of application. In general, where component E is present in the compositions of the invention, it is used at from 0.2 to 200 g/l, preferably from 2 to 100 g/l.

Component F

In addition to or instead of components D and/or E, the compositions used in accordance with the invention may comprise at least one further corrosion inhibitor. Suitable corrosion inhibitors are selected from the group consisting of butynediol, benzotriazole, aldehydes, amine carboxylates, aminophenols and nitrophenols, amino alcohols, aminobenzimidazole, aminoimidazolines, aminotriazole, benzimidazolamines, benzothiazoles, benzotriazole derivatives, esters of boric acid with various alkanolamines, such as boric acid diethanolamine ester, for example, carboxylic acids and their esters, quinoline derivatives, dibenzyl sulfoxide, dicarboxylic acids and their esters, diisobutenylsuccinic acid, dithiophosphonic acid, fatty amines and fatty acid amides, guanidine derivatives, urea and its derivatives, laurylpyridinium chloride, maleamides, mercaptobenzimidazole, N-2-ethylhexyl-3-aminosulfopropionic acid, phosphonium salts, phthalamides, amine- and sodium-neutralized phosphoric esters of alkyl alcohols, and also these phosphoric esters themselves, phosphoric esters of polyalkoxylates, and particularly of polyethylene glycol, polyetheramines, sulfonium salts, sulfonic acids such as methanesulfonic acid, for example, thioethers, thioureas, thiuramide sulfides, cinnamic acid and its derivatives, zinc phosphates and zinc silicates, and zirconium phosphates and zirconium silicates.

As further corrosion inhibitors it is preferred to use butynediol and benzotriazole.

If used at all in the compositions, the corrosion inhibitors are used in an amount of generally from 0.01 to 50 g/l, preferably from 0.1 to 20 g/l, with particular preference from 1 to 10 g/l.

Component G

In addition to or, where appropriate, instead of the abovementioned components, it is also possible to employ compounds of Ce, Ni, Co, V, Fe, Zn, Zr, Ca, Mn, Mo, W, Cr and/or Bi. In general, the use of component A in accordance with the invention in the compositions results in such good corrosion protection properties that the addition of the abovementioned compounds is unnecessary. Preferably the compositions of the invention are free from Cr(VI) and more preferably the compositions of the invention contain no compounds as per component G. Where, nevertheless, the aforementioned compounds (component G) are used, it is preferred to use compounds selected from Fe, Zn, Zr and Ca. The amount of these compounds in the compositions, where they are present at all, is generally from 0.01 to 100 g/l, preferably from 0.1 to 50 g/l, with particular preference from 1 to 20 g/l.

Component H

In addition to or instead of one or more of the above components D to G, the compositions of the invention may comprise further auxiliaries and additives. Suitable auxiliaries and additives include conductivity pigments or conductive fillers, e.g., iron phosphide, vanadium carbide, titanium nitride, carbon black, graphite, molybdenum disulfide or tin- or antimony-doped barium sulfate, with iron phosphide being preferred. Conductivity pigments or conductive fillers of this type are added to the compositions of the invention in order to improve the weldability of the metal surfaces to be treated or in order to improve subsequent coating with electrocoat materials. Moreover, silica suspensions may be employed, particularly when the compositions are used for the treatment of surfaces comprising aluminum.

These auxiliaries and/or additives are generally present in a finely divided form; in other words, their mean particle diameters are generally from 0.005 to 5 μm, preferably from 0.05 to 2.5 μm. The amount of the auxiliaries and additives is generally from 0.1 to 50% by weight, preferably from 2 to 35% by weight, based on the overall mass of the compositions of the invention.

The compositions used in accordance with the invention may further comprise additives for improving the forming characteristics, examples being wax-based derivatives based on natural or synthetic waxes, e.g., waxes based on acrylic acid, polyethylene waxes, polytetrafluoroethylene (PTFE) waxes or wax derivatives or paraffins and their oxidation products.

Depending on their area of application, the compositions used in accordance with the invention may comprise polymer dispersions based on styrene, 4-hydroxystyrene, butadiene, acrylic acid, acrylate esters, acrylamides, acrylate salts, methacrylic acid, methacrylate esters, methacrylamides, methacrylate salts, and derivatives of acrylamide. It is also possible for the compositions of the invention to comprise polyurethane dispersions and polyesterurethane dispersions or polyurea dispersions.

Another group of compounds that may be present in the compositions used in accordance with the invention embraces polyethylene glycols, polypropylene glycols, copolymers of ethylene oxide, and copolymers of propylene oxide.

The compositions used in accordance with the invention are used for passivating (conversion coating), especially no-rinse conversion coating, i.e., processes with a reduced number of rinsing operations, on galvanized steel and aluminum, for example. The passivating layer of the invention is formed on the metal surface.

The compositions used in accordance with the invention may, where appropriate, further comprise a complexing agent as component I. Examples of suitable complexing agents include ethylenediaminetetraacetic acid (EDTA), ethylenediamine (ED), citric acid, and salts of said compounds.

The compositions used in accordance with the invention may, where appropriate, further comprise at least one acid or an alkali metal salt or alkaline earth metal salt of the corresponding acid, selected preferably from the group consisting of $HNO_3$, $H_2SO_4$, $H_3PO_4$, formic acid, and acetic acid, as component K. The acid is generally used in an amount of from 0.5 to 700 g/l, preferably from 5 to 280 g/l.

In addition to the abovementioned components, the compositions used in accordance with the invention may include further additives. Suitable additives are 1-(2-vinylpyridinium)-2-ethylsulfobetaine, 1,1-dimethyl-2-propynyl-1-amine, 1-pyridinium-2-ethylsulfobetaine, 1-pyridinium-2-hydroxy-3-propylsulfobetaine, 1-pyridinium-3-propylsulfobetaine, 2,2'-dichlorodiethyl ether, 2,5-dimethyl-3-hexyne-2,5-diol, 2-butyne-1,4-diol, 2-butyne-1,4-diol ethoxylate, 2-butyne-1,4-diol propoxylate, sodium 3-(2-benzothiazolylthio)-1-propanesulfonate, sodium 3,3'-dithiobis(1-propanesulfonate), 3-[(aminoiminomethyl)thio]-1-propanesulfonic acid, sodium 3-[(dimethylamino)thioxomethyl]thio-1-propanesulfonate, potassium 3-[ethoxythioxomethyl]thio-1-propanesulfonate, sodium 3-chloro-2-hydroxy-1-propanesulfonate, 3-hexyne-2,5-diol, sodium 3-mercapto-1- propanesulfonate, 4,4'-dihydroxydiphenyl sulfone, 4-methoxybenzaldehyde, aldehydes, alkylphenyl polyethylene oxide sulfopropyl ether potassium salts, alkyl polyethylene oxide sulfopropyl ether potassium salts such as, for example, tridecyl/pentadecyl polyethylene oxide sulfopropyl ether potassium salt, sodium allylsulfonate, amidosulfonic acid, amine- and sodium-neutralized phosphoric esters of alkyl alcohols, amine carboxylates, aminophenols and nitrophenols, amino alcohols, aminobenzimidazole, aminoimidazolines, aminotriazole, methyl benzyl-acetoacetate, benzylacetone, benzimidazolamines, benzothiazoles, benzotriazole and its derivatives, benzyl pyridine-3-carboxylate, bisphenol A, esters of boric acid with various alkanolamines such as, for example, boric acid diethanol ester, carboxylic acids and their esters, carboxyethylisothiuronium betaine, quinoline derivatives, copolymers of ethylene and acrylic acid, copolymers of imidazole and epichlorohydrin, copolymers of imidazole, morpholine and epichlorohydrin, copolymers of N,N'-bis[3-(dimethylamino)propyl]urea and 1,1'-oxybis[2-chloroethane], copolymers of n-butyl acrylate, acrylic acid, and styrene, dibenzyl sulfoxide, dicarboxylic acids and their esters, diethylenetriaminepentaacetic acid and salts derived from it, diisobutenylsuccinic acid, disodium ethylenebisdithio-carbamate, dithiophosphonic acid, ethylamidosulfonic acid, ethylenediaminetetraacetic acid and salts derived from it, ethylglycinediacetic acid and salts derived from it, ethylhexanol ethoxylate, fatty amines and fatty acid amides, formaldehyde, glycerol ethoxylate, guanidine derivatives, urea and its derivatives, hydroxyethyliminodiacetic acid and salts derived from it, imidazole, isopropylamidosulfonic acid, isopropylamidosulfonyl chloride, lauryl/myristyltrimethylammonium methosulfate, laurylpyridinium chloride, maleamides, mercaptobenzimidazole, methylamidosulfonic acid, N,N,N',N'-tetrakis(2-hydroxypropyl)ethylenediamine, N,N-diethyl-2-propyn-1-amine, N,N-diethyl-4-amino-2-butyn-1-ol, N,N-dimethyl-2-propyn-1-amine, N-2-ethylhexyl-3-aminosulfopropionic acid, N-allylpyridinium chloride, sodium salt of sulfated alkylphenol ethoxylates, sodium 2-ethylhexyl sulfate, nicotinic acid, nitrilotriacetic acid and salts derived from it, sodium nitrobenzenesulfonate, N-methallylpyridinium chloride, ortho-chlorobenzaldehyde, phosphonium salts, phthalamides, picolinic acid, polyetheramines, polyethyleneimines, polyvinylimidazole, propargyl alcohol, propargyl alcohol ethoxylate, propargyl alcohol propoxylate, sodium propynesulfonate, propiolic acid, propylenediaminetetraacetic acid and salts derived from it, pyrrole, quaternized polyvinylimidazole, reaction product of 2-butyne-1,4-diol and epichlorohydrin, reaction product of 2-butyne-1,4-diol and propane sultone, reaction product of saccharin and propane sultone, reaction product of alkyl ethoxylate/propoxylate with propane sultone, reaction product of polyethyleneimine with propane sultone, reaction product of β-naphthol ethoxylate/propoxylate with propane sultone, resorcinol ethoxylate, saccharin, β-naphthol ethoxylate, sodium β-naphthol ethoxylate sulfate, sulfonium salts, sulfonic acids such as methanesulfonic acid, for example, thiodiglycol, thiodiglycol ethoxylate, thioethers, thioureas, thiuramide sulfides, sodium vinylsulfonate, cinnamic acid and its derivatives, zinc phosphates and zinc silicates, zirconium phosphates and zirconium silicates, hypophosphites (e.g., sodium hypophosphite), $NaBH_4$, dimethylaminoborane, diethylaminoborane, hydrazine, formaldehyde, urotropin, palladium chloride, sodium stannate, $HF_xBF_3$, polyethylene glycols of molecular weight 100-1 000 000 g/mol, block copolymers of ethylene oxide and propylene oxide, examples being Pluronic grades from BASF Aktiengesellschaft, Ludwigshafen/Rhein, and random copolymers of ethylene oxide and propylene oxide, especially those with molecular weights in the range 100-2000 g/mol.

In one especially preferred embodiment the passivating layer of the invention, in addition to the water-soluble nitrogen-containing polymer, contains metal ions of the substrate metal, especially aluminum and zinc, and/or alloying metal ions of alloy metals with aluminum or zinc, but no other metals. This means that the compositions used to prepare the passivating layer comprise no metals or metal compounds. Even without the addition of further metals or metal compounds the use of the water-soluble nitrogenous polymers in accordance with the present invention produces passivating layers which have an outstanding corrosion stability.

The thickness of the passivating layer of the invention formed on the surface of the substrate metal is preferably $\leq 3$ μm. More preferably the thickness is 0.01 to 3 μm, very preferably 0.1 to 3 μm. The thickness of the layer is determined by differential weighing before and after the composition used in accordance with the invention has acted on the metal surface, assuming that the layer has a specific density of 1 kg/l. A layer thickness specified below is always a parameter thus determined, irrespective of what is the actual specific density of the layer. These thin layers are enough to achieve outstanding corrosion protection. Such thin layers ensure the dimensional compliance of the passivated workpieces.

The present specification further provides a surface composed of a metal surface and a passivating layer in accordance with the present specification. Suitable metal surfaces and those used with preference, and preferred embodiments of the passivating layer, have already been mentioned above.

The present specification additionally provides a process of forming the passivating layer of the invention on a metal surface, which involves contacting the metal surface with a composition as defined in accordance with the present specification. Suitable compositions and preferred embodiments of suitable compositions have already been mentioned above. Suitable metal surfaces and preferred embodiments of metal surfaces have likewise already been mentioned above.

In the process of the invention the water-soluble nitrogenous polymer used in accordance with the invention can be in the form of a solution, emulsion, suspension or aerosol. In the compositions used in the process of the invention the polymer (component A) is preferably in aqueous solution.

The mode of application corresponds to industry standard methods. The metal surface is preferably contacted with compositions used in accordance with the invention by the spraying of the composition onto the metal surface or by the dipping of the metal surface into the composition. The particular application method employed with particular preference depends on the number, size, and shape of the parts to be treated. Accordingly, contacting takes place preferably by means of a spraying, rolling or dipping process.

Where the passivating layer of the invention is applied to metal strips by phosphating, compositions in accordance with the present specification comprising phosphoric acid as component E may be applied by a roll-on or dry-in-place or no-rinse process, with the phosphating composition used in accordance with the invention being applied to the metal strip and dried without rinsing, a polymer film being formed.

The present specification further provides a process comprising the following steps:
a) where appropriate, cleaning the metal surface to remove oils, fats, and dirt,
b) where appropriate, washing with water,
c) where appropriate, pickling to remove rust or other oxides,
d) where appropriate, washing with water, e) contacting the metal surface with a composition comprising a water-soluble nitrogenous polymer, the polymer being a base, and an aqueous solution of the polymer forming a precipitate at a pH<7 when one or more salts of the metal of the metal surface are added (component A),
f) where appropriate, washing with water,
g) where appropriate, aftertreatment.

The contacting of the metal surface with the water-soluble nitrogenous polymer used in accordance with the invention is the passivating step, in particular a phosphating step, of the processes known to the skilled worker. The passivating layer of the invention is formed on the metal. Where phosphating is carried out in step e), it is possible to aftertreat the metal surface in g) with passivating additives.

Water-soluble nitrogenous polymers (component A) employed with preference have already been identified above.

Washing with water takes place between the individual process steps in order to prevent contamination of the solution required for the following step with components of the solution used in the preceding step.

It is, however, also possible to carry out the process of the invention as a no-rinse process, i.e., without steps b), d), and f).

In the process known as the "no-rinse" process the composition used in accordance with the invention is generally either sprayed onto the metal surface or transferred to the surface by means of application rollers. This is followed by a period of exposure of generally in the range from 2 to 20 seconds then, without further intermediate rinsing, by drying of the composition used in accordance with the invention. Drying can take place, for example, in a heated oven.

The steps of cleaning (step a)) and of contacting the metal surface in the presence of the water-soluble nitrogenous polymer (component A) used in accordance with the invention (step e)) may also be performed in one step, i.e., with a formulation comprising not only the customary detergents but also the composition used in accordance with the invention.

The process of the invention takes place in general at a temperature of from 5 to 100° C., preferably from 10 to 80° C., more preferably from 15 to 45° C.

The present specification further provides for the use of a composition comprising a water-soluble nitrogenous polymer, the polymer being a base, and an aqueous solution of the polymer forming a precipitate at a pH<7 when one or more salts of the metal of the metal surface are added, to passivate a metal surface. Compositions used with preference, and polymers (component A) used with preference in the compositions, have already been mentioned above. Metal surfaces used with preference, and also processes for passivating the metal surfaces that are conducted with preference, have likewise already been mentioned above.

Following the process of forming a passivating layer on a metal surface, the metal surface provided with the passivating layer of the invention can be provided, subsequent to process steps a) to g), with a coating material. Coating takes place in accordance with methods which are known to the skilled worker. The coating material used can, for example, be a powder coating material or an electrolytically depositable, especially cathodically depositable, deposition coating material.

The present specification accordingly further provides a coating system on a metal surface, comprising at least one passivating layer X of the invention and at least one coating film, preferably two or more coating films, as layer(s) Y.

The passivating layer and its preferred embodiments have already been mentioned above. Suitable coating films are known to the skilled worker.

The coating system of the invention can be a multicoat paint system (two or more coating films) with additional layers. For example, a multicoat paint system may be composed of at least one of the following layers, which typically can be arranged as follows:
 a layer W which is pigmented and/or is provided with effect substances,
 a layer Z selected from the group consisting of primer, basecoat, undercoat, pigmented coat or coat provided with effect substances.

As color and/or effect coating materials in the layer Z and/or W, suitable coating materials include in principle all that are customary for these purposes and known to the skilled worker. They can be curable physically, thermally, with actinic radiation or both thermally and with actinic radiation (dual cure). They can be conventional basecoat materials, aqueous basecoat materials, substantially solvent-free and water-free liquid basecoat materials (100% systems), substantially solvent-free and water-free solid basecoat materials (pigmented powdercoating materials) or substantially solvent-free pigmented powdercoating dispersions (powder slurry basecoat materials). They may be heat-curable or dual cure, and internally or externally crosslinking.

It is possible to use one or more, preferably from 1 to 3, more preferably 1 or 2, and very preferably one color and/or effect coating material in the layers.

"Substantially solvent-free" means that the coating material in question has a residual volatile solvent content of <2.0% by weight, preferably <1.5% by weight, and more preferably <1.0% by weight. It is especially advantageous if the residual content is below the limit of detection by gas chromatography.

In the multicoat paint systems it is particularly preferred to employ aqueous basecoat materials such as those known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 or EP 0 817 684, column 5 lines 31 to 45.

The color and/or effect coating materials described above may serve to produce not only color and/or effect basecoats but also color- and/or effect-providing combination effect coats. By these are meant a coating which fulfils at least two functions in a multicoat color and/or effect paint system. Such functions include in particular that of protection against corrosion, promotion of adhesion, absorption of mechanical energy, and the provision of color and/or effect. In particular the combination effect coat serves to absorb mechanical energy and to provide color and/or effect at the same time; accordingly it fulfils the functions of a surfacer coat or antistonechip primer coat and of a basecoat. In addition, preferably, the combination effect coat also has a corrosion protection effect and/or adhesion promotion effect.

Typical thicknesses of the layer (W) and/or (Z) range from 0.1 to 2000 μm, preferably from 0.5 to 1000 μm, more preferably from 1 to 500 μm, very preferably from 1 to 250 μm, and in particular from 10 to 100 μm.

The coating materials which can be used in the multicoat paint systems may be color and/or effect pigments. Suitable color pigments include all organic or inorganic pigments which are customary in coating materials. Examples of organic and inorganic color pigments include titanium dioxide, micronized titanium dioxide, iron oxide pigments, carbon black, azopigments, phthalocyanine pigments, quinacridone pigments, and pyrrolopyrrole pigments.

The effect pigments are notable in particular for a platelet-like structure. Examples of effect pigments include the following: metal pigments, e.g., of aluminum, copper or other metals; interference pigments, such as metal-oxide-coated metal pigments, for example, e.g., titanium-dioxide-coated or mixed-oxide-coated aluminum, coated mica, such as titanium-dioxide-coated mica, and graphite effect pigments. In order for example to improve the hardness, it can be advantageous to use UV-curable pigments and, where appropriate, fillers as well. These are radiation-curable compounds, e.g., acryloyl-functional silanes, coated pigments/fillers, which can therefore be included in the radiation cure operation.

The coating system of the invention is generally produced by a process comprising the steps of:
a) forming a passivating layer X in accordance with an above-mentioned process of forming the passivating layer;
b) coating the passivating layer.

A process for forming the passivating layer, along with preferred embodiments of that process, has already been mentioned above. Coating processes suitable for step b) are known to the skilled worker.

The following examples further illustrate the invention.

EXAMPLES

Comparative Examples

Metal test panels (galvanized steel, 20 μm zinc) were passivated by a passivating method specified in table 1. The stability time was determined in a salt spray test.

Salt Spray Test

The measure used for the corrosion inhibition effect is the result of a salt spray test according to DIN 50021. The stability time in the corrosion test is defined differently according to the type of corrosion damage observed.

If white spots are formed with a diameter of generally more than 1 mm (Zn oxide or Al oxide, known as white rust) the stability time reported is the time after which the observed damage corresponds to evaluation stage 8 in DIN EN ISO 10289 of April 2001, annex B, page 19.

If black spots are formed with a diameter of generally less than 1 mm (in particular on zinc provided with a passivating layer) before white spots are formed the stability time reported is the time after which the observed damage corresponds to evaluation stage 8 in DIN EN ISO 10289 of April 2001, annex A, page 9.

TABLE 1

|  | Passivating method | Stability time |
|---|---|---|
| Comparative example | Passivation in $HNO_3$, 0.1% | <1 h |
| Comparative example | Commercial Cr(III) high-build passivation (EP-A 0 907 762) | >>10 h |

The reagents specified in table 2 are dissolved with the concentration C in 0.1% $HNO_3$. Metal test panels (galvanized steel, 20 μm zinc) are immersed in the solution for 1 minute and dried by suspending them overnight. In some cases the layer thickness D is determined by differential weighing. The stability time is determined in a salt spray test.

Differential Weighing

The thickness of the layer is determined by differential weighing before and after the composition used in accordance with the invention has acted on the metal surface, on the assumption that the layer has a specific density of 1 kg/l. Reference to a layer thickness in the text below always refers to a parameter determined in this way, irrespective of the actual specific density of the layer.

TABLE 2

|  | Reagent | C [% by weight] | Stability time [h] |
|---|---|---|---|
| Performance example | Polyvinylimidazole K value* 18 | 5 | 8 |
| Performance example | Polyvinylimidazole K value 18 | 1.5 | 4 |
| Performance example | Polyvinylimidazole K value 26 | 5 | 6 |
| Comparative example | Acrylic acid-methacrylic acid copolymer reacted with 1 mol of 3-dimethyl-aminopropyl-amine per carboxylate group | 5 | <1 |
| Comparative example | Acrylic acid-methacrylic acid copolymer reacted with 1 mol of diethylenetriamine per carboxylate group | 5 | <1 |
| Comparative example | Acrylic acid-methacrylic acid copolymer reacted with 1 mol of imidazole per carboxylate group | 5 | <1 |
| Comparative example | Polyvinylpyrrolidone K value 30 (DE-A10005113) | 5 | <1 |

When comparing untreated metal panels with their treated counterparts (i.e., those provided with a passivating layer of the invention) a trebling in the stability time in the corrosion test is understood to be a reliable indication of a corrosion inhibition effect.

The stability time in the corrosion test can be improved further still by immersing the systems at a higher temperature (e.g., at 60° C.) or in more concentrated solutions, including nitric acid with a concentration changed from that of the examples specified above. For instance, an increase in the concentration of the polymer results in a prolongation of the stability time. With preference the concentration of the polymer is <5% by weight.

An aqueous solution of zinc chloride forms a white, insoluble precipitate with aqueous polyvinylimidazole solution over wide concentration ranges, generally starting from just 0.5% by weight of the polymer.

* The K value is the Fikentscher constant for characterizing the average molecular weight; cf. H.-G. Elias, Makromoleküle Vol. 1, $5^{th}$ edition, Hüthig & Wepf Verlag, Basel 1990, page 99.

What is claimed is:

1. A process for forming a passivating layer X abutting a metal surface selected from zinc and aluminum and alloys of these metals with other alloying ingredients, wherein the metal surface is contacted with a composition comprising homopolyvinylimidazole in an amount of from 0.01 to 100 g/l based on 1l of the composition.

2. A process as claimed in claim 1, wherein said contacting is effected by spraying, rolling or dipping methods.

3. A method of passivating a metal surface selected from zinc and aluminum and alloys of these metals with other alloying ingredients, comprising contacting the metal surface with a composition comprising homopolyvinylimidazole in an amount of from 0.01 to 100 g/1 based on 1l of the composition to form a passivating layer X abutting the metal surface.

4. A method of passivating a metal surface as claimed in claim 3, further comprising adding an aluminum and/or a zinc salt to the composition comprising homopolyvinylimidazole.

5. A method of passivating a metal surface as claimed in claim 3, further comprising forming a precipitate at a pH<7.

6. A process of forming a metal surface construction comprising a passivating layer X abutting a metal surface selected from zinc and aluminum and alloys of these metals with other alloying ingredients, and a coating film Y, the process comprising:
   a) forming a passivating layer X by contacting the metal surface with a composition comprising homopolyvinylimidazole in an amount of from 0.01 to 100 g/l based on 1l of the composition; and
   coating the passivating layer X with the coating film Y.

7. A process as claimed in claim 6, wherein said contacting is effected by spraying, rolling or dipping methods.

\* \* \* \* \*